United States Patent
Brown et al.

[15] 3,657,063

[45] Apr. 18, 1972

[54] PROCESS AND ARTICLE COMPRISING A LAYER OF A TERNARY COMPOSITION OF HAFNIA; ZIRCONIA AND TITANIA BONDED TO A SILICA SUBSTRATE

[72] Inventors: Sherman D. Brown, Simi; Thomas F. Schroeder, Los Angeles, both of Calif.; Earl E. Conabee, Morris Plains, N.J.

[73] Assignee: North American Rockwell Corporation, by said Brown and said Schroeder

[22] Filed: Nov. 20, 1967

[21] Appl. No.: 686,377

[52] U.S. Cl. ............................. 161/192, 161/193, 161/196, 161/198, 156/86, 156/89
[51] Int. Cl. ........................................................ B32b 17/06
[58] Field of Search ................. 161/192, 198, 206, 196, 182, 161/225, 193; 252/507, 520; 106/57; 117/150.2, 123; 29/472.9; 156/311, 86, 89

[56] References Cited

UNITED STATES PATENTS

| | | | |
|---|---|---|---|
| 2,924,537 | 2/1960 | Wallis et al. | 161/198 X |
| 2,984,576 | 5/1961 | Alexander et al. | 106/57 X |
| 3,122,883 | 3/1964 | Terner | 161/192 X |
| 3,165,864 | 1/1965 | Shulze | 161/182 X |
| 3,325,303 | 6/1967 | Lant et al. | 117/105.2 X |
| 3,409,451 | 11/1968 | Zeitsch | 106/57 X |
| 3,440,132 | 4/1969 | Koubek | 117/105.2 |
| 3,459,569 | 8/1969 | Ellis | 161/192 X |

*Primary Examiner*—John T. Goolkasian
*Assistant Examiner*—D. J. Fritsch
*Attorney*—Thomas S. MacDonald and L. Lee Humphries

[57] ABSTRACT

An article of manufacture consisting of a high thermal shock resistant composite, said composite formed of a first layer of a composition of low expansion particulate oxide layer intimately bonded to a second layer of a low expansion preformed silica material. The particulate oxide layer consists essentially of 60 to 85 mole percent hafnia, 10 to 30 mole percent zirconia and 10 to 30 mole percent titania.

8 Claims, No Drawings

PROCESS AND ARTICLE COMPRISING A LAYER OF A TERNARY COMPOSITION OF HAFNIA; ZIRCONIA AND TITANIA BONDED TO A SILICA SUBSTRATE

The present invention relates to a novel composite article of manufacture which is suitable for employment where high temperatures, oxidizing environments and large head fluxes must be met. More particularly, the instant invention pertains to a novel composite material consisting of a low, linear thermal coefficient of expansion oxide composition intimately bonded to a low, linear thermal coefficient of expansion silica substrate. Specifically, the subject invention is concerned with a low expansion hafnium, titanium, zirconium, oxide composition which is firmly joined to a fused silica containing surface. Another inventive feature of the subject invention resides in providing a structural support for the composite article consisting of hermetically sealed low expansion hafnium, zirconium, titanium, silica composite article of manufacture.

A critical need exists for light weight, relatively inexpensive, essentially free thermal shock resistant structural composite materials. The need for the above materials is especially pronounced where metal and other surfaces of diverse geometric design generally require protection from cracking and spalling produced by the action of heat on said surfaces, and where like surfaces are intimately contacted at high temperatures by the hot gaseous elements produced in a combustion process.

It will be appreciated by those versed in the instant art that if novel composite materials possessing thermal shock resistance are made readily available for protecting metallic structural members and other integral parts from melting and oxidizing, said material would have a positive use in the fields of industry and science. Also, it will be further appreciated by those knowledged in the art that a novel composite material characterized by a low thermal linear coefficient of expansion for protecting metals and the like against the extremes of heat would likewise represent a significant contribution to the art.

Accordingly, it is an object of the present invention to provide a novel composite material for containing combustion gases and protecting structural members from heat and oxidizing conditions.

Another object of the subject invention is to provide a novel composite material consisting of a low, thermal linear coefficient of expansion composition intimately bonded to a low, thermal linear coefficient of expansion substrate for affording protection against elevated temperatures to diverse metal and metallic-like surfaces.

Yet another object of the instant invention is to make available a light weight, relatively inexpensive thermal shock resistant structural composite material for fixing to metal-like surfaces to essentially preventing cracking and spalling of said metal-like surfaces wherein said latter surfaces are in close proximity with elevated temperatures.

Still another object of this invention is to provide a novel composite article of manufacture consisting essentially of a hafnium oxide, titanium oxide, zirconium oxide composition wherein said composition is intimately bonded to a fused silica substrate to form said composite article.

Still a further object of the invention is to provide a reinforced composite structure for applying to and for protecting heat exposed surfaces, and, wherein said reinforced composite structure consists of a hafnia rich oxide coating on a fused silica substrate, said substrate reinforced by a substrate of plastic, graphite or the like.

Yet still a further object of the invention is to provide a means for overcoming the difficulties associated with the prior art.

Yet still another object is to provide a novel material that can be easily fabricated, a material possessing the aforesaid qualities and advantages and which material can be manufactured relatively inexpensively.

These and other objects, features and advantages, will be readily apparent to those skilled in the art from the following specification and the appended claims.

In attaining the novel objects and unobvious advantages of this invention, it has now been unexpectedly found that a hafnia-rich mixed oxide composition having a low thermal coefficient of expansion can be intimately bonded to a low thermal coefficient of expansion fused silica substrate without any readily apparent mismatch of coefficients of expansion, and that the silica coated substrate can be effectively employed for protecting metallic members against degradation and erosion resulting from heat.

The hafnia-rich mixed oxide composition of the subject invention consists essentially of commercially available hafnium oxide, titanium oxide and zirconium oxide. These oxides are generally art known as hafnia ($HfO_2$), titania ($TiO_2$) and zirconia ($ZrO_2$). The ternary oxide composition as employed herein generally consists essentially of 60 to 85 mole percent hafnia, 10 to 30 mole percent titania and 10 to 30 mole percent zirconia, with the preferred mole ratio dependent upon the thermal expansion characteristics of the particular silica substrate. The ternary composition fabricated herein generally have an expansion not exceeding $10 \times 10^{-6}/°C$. over the range of $0°-1,000°C$, and they usually range from about $-1 \times 10^{-6}/°C$. ($0°-1,000°C$.) to about $5 \times 10^{-6}/°C$.($0°-1000°$). Also, hafnia $HfO_2$, has a density of about 9.68 gm./cm. while the present compositions have a density ranging from 6 to 8 gm. per cc., and thereby significantly lessen the overall weight of the manufactured item.

The low expansion silica containing materials referred to herein are the commercially available fused quartz and fused silica, and when used herein, fused quartz and fused silica are used as functionally equivalents. Generally, the low expansion silica materials suitable for the purpose of the invention will have a coefficient of expansion usually not exceeding $10 \times 10^{-6}/°C$. (over the range of $0°-1,000°C$.). Fused silica possesses a coefficient of expansion of about $0.5 \times 10^{-6}/°C$. (over the range of $0°- 1,000°C$.).

Structural supporting members conveniently employed for strengthening the hafnia-rich oxide fused silica composite laminate are reinforcing agents like graphite, carbon, metal sprayed ceramics, foamed ceramics, phenolic plastics, metal and other like functionally equivalent agents which do not adversely affect the silica.

The binders suitable for the purpose of the present invention are the acceptable binders or vehicles that will readily burn off the volatize during the heating procedure. In addition, the organic binders should not react or adversely affect any of the ingredients making up the oxide composition. As examples of organic binders can be mentioned stearic acid, gelatine dissolved in water, nitrocellulose and butylacetate, acrylic acid and the like.

The ternary oxide composition utilized herein can be prepared by the steps of first intimately blending selected amounts of the three oxides listed supra, next pressing the just mixed oxides into a predetermined shape and then heating the shaped oxide mixture for about one-half to 2 hours, usually for about 1 hour at a temperature of about $3,5000°$ F. to $4,000°$ F., usually at $3,800°$ F., to effect a homogeneous, solid composition. The ternary composition can be ground to any given mesh size, mixed with a binder, pressed to the shape of a mandrel and fired at elevated temperatures to produce the preformed mandrel shape. The ternary composition can also be ground to a specific mesh size and plasma sprayed onto a low expansion silica containing substrate. The ternary composition can also be slip casted and sintered, pressed and sintered, molded, and the like into desired preformed shapes. The silica containing material can also be shaped into a specific design of a predetermined thickness by slip casting, molding and the like and then intimately joined to the ternary oxide composition.

The following examples are representative of embodiments of the mode and manner of the present invention and these examples are not to be construed as limiting as other obvious embodiments will be readily apparent to those versed in the art.

EXAMPLE I

A typical ternary composition used for the purpose of the subject invention was prepared as follows: 60 mole percent of powdered hafnia, 20 mole percent of powdered zirconia and 20 mole percent of powdered titania were mixed for about 24 hours in a commercially available V-blender to insure an intimate mixture of the three ingredients. Next the mixed powders were cold pressed at room temperature and at a pressure of 20,000 p.s.i. into pellets 1 inch in diameter and about 1 inch long. The pressed pellets were next fired in an oxygen acetylene heated furnace for about 1 hour at about 3,8000° F. (about 2,100°Co), to produce a homogeneous composition consisting essentially of $HfO_2$, $ZrO_2$ and $TiO_2$.

EXAMPLE II

A composite laminate consisting essentially of the ternary oxide composition hermetically bonded to a fuse silica substrate was fabricated as follows: the pellets prepared according to the procedure set forth in Example I were ground in a conventional ball mill to a fine powder and the powder was screened to a uniform particle size ranging from 200 to 270 mesh and from 270 to 325 mesh. The particles of from 200 to 270 mesh and from 270 to 325 mesh were separately plasma sprayed onto a fused silica substrate. An inert gas, argon, was used to feed and carry the particles. Typical art known plasma spraying techniques were employed. Secondary oxygen injection into the plasma stream was used to maintain oxidizing conditions during the plasma spray process. The hafnia-rich composition firmly and intimately bonded to the fused silica substrate. The bonded particles on the substrate were about 2 to 3 mils thick.

EXAMPLE III

A thermal shock resistant structural composite material prepared according to the spirit of the instant invention was fabricated as follows: commercially available, high purity oxides of hafnium, titanium and zirconium were separately ground to a fine powder and mixed in a mole ration of $HfO_2$ to $ZrO_2$ to $TiO_2$ of 3:1:1. The three oxides were intimately mixed overnight in a blender and then pressed at a pressure of 20,000 p.s.i. into pellets and fired in a preheated oxygen acetylene furnace for 1 hour at 3,700° F. to 3,800° F. After cooling to room temperature, the pellets were ground into two separate particle sizes, one size containing particles of from 200 to 270 mesh and the other containing particles of from 270 to 325 mesh. Next, the particles of each group were flame sprayed onto a fused silica surface using an oxygen acetylene flame spray. The particles sprayed stoichiometrically when the oxygen to acetylene ration was 2:1 or greater. Particle coatings of about 10 mils in depth were successfully sprayed onto the fused silica surfaces. The particle adherence was very good and they reacted with the substrate to intimately bond with the substrate at the interface.

EXAMPLE IV

The operability of the low expansion structural composite employed for protecting a surface exposed to high temperature was exemplified as follows: A mixture of 60 mole percent hafnia, 20 mole percent titania 20 mole percent and 1 percent stearic acid was blended overnight and then fired for about 1 hour at 3,700° F. to 3,800° F. to produce the desired homogeneous composition. After cooling to room temperature, the composition was crushed, ground and sieved to a powder size of 100 mesh. Next, the sieved powder was isostatically pressed around a steel mandrel at a pressure of 30,000 pounds per square inch. The outside surface of the pressed composition was next machined to the shape of a rocket throat insert. The insert was then sintered in a preheated oven at 3,700°F. for 1 hour, and it was allowed to cool overnight in the furnace. Next, a layer of fused quartz was hermetically and firmly bonded to the external surface of the insert by hot working and shrinking a fused quartz tube around the outside of the insert. The composite fused quartz, and ternary solid solution of hafnia, titania, zirconia throat insert was then placed in a test model hydrogen-LOX rocket chamber and successfully test fired at a temperature of about 4,000°F. with no degradation of the throat or chamber.

EXAMPLE V

The thermal shock resistance of a composition consisting of 60 mole percent hafnia, 30 mole percent zirconia and 10 mole percent titania was further demonstrated as follows: first, the thoroughly mixed oxides were calcined in an air atmosphere at 1,600° C. for about 2 hours. After cooling to room temperature, the just formed composition was ground to a fine particle size of 100 mesh, mixed with an acrylic acid binder, dried in an oven, and then pressed into pellets. The pellets were fired at 1,750° C. for 3 hours in an oxygen acetylene furnace. After cooling to room temperature, the pellets were thermal shocked by heating to 4,000° F. in about 1 to 2 seconds. The macroscopically observed thermal shock resistance was excellent.

EXAMPLE VI

The density and the thermal coefficient of expansion of a hafnia-rich composition consisting of 60 mole percent $HfO_2$, 20 mole percent $ZrO_2$ and 20 mole percent $TiO_2$ was 7.62 gm./cc. and $3.1 \times 10^{-6}$/°C. (0°—1,000° C.). The composition with the above physical properties was prepared by calcinating 137.6 gm of the mixed oxides at 1,750° C. in an oxygen acetylene furnace. After cooling to room temperature, the composition was ground to a particle size of 150 mesh and hot pressed in a graphite die, about 1 1/4 inches in diameter, at 1,200° C, for 5 minutes at 3,000 p.s.i. The hot pressed density was 64 percent. The composition was next sintered in a preheated oven at 2,000° C. for about 1 hour. The final density was 7.62 gm./cc. or about 91 percent of the theoretical density. The oxide composition was used for plasma spraying onto a fused silica substrate with excellent thermal shock resistance.

The novel composite material of the present invention can be employed to manufacture items of commerce and science. For example, the composite can be used for nozzle applications in high performance rocket engines, for lining ovens and furnaces, for throat sections of hypersonic wind tunnels, for light weight combustion chambers and the like.

While the illustrative embodiments of the invention have been described with particularity, it will be understood that various modifications will be apparent and can readily be made by those skilled in the art without departing from the scope and spirit of the invention.

We claim:

1. A composite thermal shock resistant article of manufacture comprising a ternary composition consisting essentially of 60 to 85 mole percent hafnia, 10 to 30 mole percent zirconia and 10 to 30 percent titania intimately bonded to a substrate consisting essentially of silica and wherein said ternary composition and silica substrate have thermal linear coefficients of expansion not exceeding $10 \times 10^{-6}$/°C. (0°–1000° C.).

2. A composite article according to claim 1 wherein said ternary composition consists essentially of 60 mole percent hafnia, 20 mole percent titania and 20 mole percent zirconia.

3. A composite article according to claim 1 wherein said silica substrate is fused silica.

4. A composite article according to claim 1 wherein said silica substrate is fused quartz.

5. A composite article according to claim 1 wherein said ternary composition has a thermal linear coefficient of expansion of from about $-1 \times 10^{-6}$/° C. (0°–1,000° C.) to about $5 \times 10^{-6}$/°C. (0°–1,000°C).

6. A composite article according to claim 1 wherein the silica substrate is reinforced by a carbon, ceramic, metal orphenolic resin substrate.

7. A composite article according to claim 1 wherein said article consists of a layer of 60 mole percent hafnia, 20 mole percent titania and 20 mole percent zirconia hermetically bonded to a fused silica surface and wherein said silica substrate is reinforced by a phenolic resin substrate.

8. A method of fabricating a composite bonded article of manufacture having at least two surfaces having thermal linear coefficients of expansion not exceeding $10 \times 10^{-6}$/°C. (0°–1,000° C.) wherein said method comprises intimately bonding a first surface of a ternary composition consisting essentially of 60 to 85 mole percent hafnia, 10 to 30 mole percent titania and 10 to 30 mole percent zirconia to a second surface consisting essentially of silica to be bonded, heating said ternary composition to a temperature at least as high as its melting temperature when contacted with the other surfaces to be thermally bonded and cooling the thus formed composite article.

* * * * *